United States Patent [19]

Nomura et al.

[11] Patent Number: 4,640,558
[45] Date of Patent: Feb. 3, 1987

[54] ANTI-SKID BRAKE SYSTEM

[75] Inventors: Yoshihisa Nomura, Toyota; Hiroyuki Oka, Susono; Hiromi Otsuki, Anjyo, all of Japan

[73] Assignees: Toyota Jidosha Kabushiki Kaisha; Nippondenso Co., Ltd., both of Japan

[21] Appl. No.: 635,229

[22] Filed: Jul. 27, 1984

[30] Foreign Application Priority Data

Jul. 29, 1983 [JP] Japan ................... 58-140391

[51] Int. Cl.⁴ .................... B60T 8/36; B60T 13/68
[52] U.S. Cl. .................... 303/119; 137/627.5; 137/596.17
[58] Field of Search .............. 303/119, 115, 68, 40; 137/627.5, 599, 614.14, 596.17; 251/139, 140, 141, 129.14; 91/31

[56] References Cited

U.S. PATENT DOCUMENTS

| | | | |
|---|---|---|---|
| 3,550,966 | 12/1970 | Leiber | 303/119 |
| 3,719,401 | 3/1973 | Peruglia | 303/119 |
| 3,989,063 | 11/1976 | Brouwers et al. | 137/627.5 |
| 4,320,731 | 3/1982 | Bouvet et al. | 251/139 |

Primary Examiner—Douglas C. Butler
Assistant Examiner—Alvin Oberley
Attorney, Agent, or Firm—Finnegan, Henderson, Farabow, Garrett & Dunner

[57] ABSTRACT

An anti-skid brake system for a brake cylinder of a vehicle, comprising: a primary fluid passage for connecting a master cylinder to the brake cylinder; a solenoid-operated directional control valve disposed in the primary fluid passage for communication of the brake cylinder selectively with the master cylinder or a brake fluid reservoir; a control device sensing a skidding condition of a wheel at which the brake cylinder is disposed, and controlling the directional control valve according to the sensed skidding condition of the wheel; a restrictor disposed in the primary fluid passage in series connection with the directional control valve; and a shut-off valve disposed in the primary fluid passage in parallel connection with the restrictor and controlled by the control device, the shut-off valve being normally placed in its open position, and brought into its closed position at the time when the control device has started to activate the directional control valve for preventing the wheel from skidding. The directional control valve and the shut-off valve are mounted in the same housing and are operated by a single, common solenoid.

14 Claims, 5 Drawing Figures

ANTI-SKID BRAKE SYSTEM

BACKGROUND OF THE INVENTION

The present invention relates generally to a hydraulic brake system for an automative vehicle, and more particularly to a vehicle anti-skid brake system for efficient braking of the vehicle without skidding of its wheels, wherein skidding conditions of the wheels are sensed, and a hydraulic braking pressure applied to brake cylinders for the wheels is controlled in response to the sensed skidding conditions of the wheels.

In a common hydraulic brake system for an automotive vehicle, hydraulic braking pressure generated by a master cylinder upon activation of a brake operating member of the vehicle is applied through brake fluid passages to brake cylinders disposed adjacent to respective wheels, so that the brake cylinders are operated with the hydraulic pressure to apply a brake to the wheels and thereby restrain their rotation. In recent years, it has been the practice to provide such a brake system with a solenoid-operated directional control valve, which is disposed in the fluid passage to effect communication of the brake cylinders selectively with the master cylinder or a brake fluid reservoir of the system. This selective communication is achieved by operating the directional control valve under automatic control by a suitable control device which is adapted to sense a skidding or locked condition of each wheel under braking and regulate the operation of the directional control valve according to the sensed skidding condition of the wheel.

The above indicated anti-skid brake system, wherein the actually sensed skidding conditions of the wheels are used to control the hydraulic pressure to be applied to the respective brake cylinders for the wheels, is capable of efficient braking of the vehicle without skidding of the wheels during braking of the wheels. However, the activation of the directional control valve may cause a subsequent abrupt or sudden supply of a presurized fluid to the brake cylinders, i.e., the control valve may fail to accomplish a smooth variation in operating pressure of the brake cylinders. For this reason, a suitable restrictor is generally provided in the fluid passage.

On the other hand, the provision of a restrictor for such purpose is disadvantageous in several aspects. Described more specifically, upon initiation of a brake application, a relatively large amount of brake fluid should be supplied to the brake cylinder before a piston in the brake cylinder starts the application of an effective braking force to the wheel, that is, a certain amount of brake fluid is needed before brake clearance has been eliminated, and before a piston cup of the brake cylinder and other components of the system which are subject to deformation under a relatively low pressure, have undergone deformation to the extent that permits the brake cylinder to initiate actual brake application to the wheel. In such circumstances, the use of a restrictor in the fluid passage is not desired. An excessive restriction of pressure or flow of the fluid by the restrictor contributes to prevention of a smooth, rapid supply of the brake fluid to the brake cylinder, which leads to a delayed braking action of the brake cylinder. Further, with the brake fluid restricted in an excessive degree, a relatively high pressure is developed in a pressure chamber of the master cylinder before a piston cup of the master cylinder piston has passed a relief port (compensating port) which communicates with the pressure chamber and a brake fluid reservoir. The pressure buildup in the pressure chamber at this time may cause the piston cup to be moved within the pressure chamber with a portion of the cup being forced into the opening of the relief port, whereby the piston cup of the master cylinder is likely to be subject to local wear or damage.

Stated another way, a restriction of fluid flow through the fluid passage leading to the master cylinder is not desired during an initial stage of brake application wherein a large amount of brake fluid is required, but such a restriction is desired when the anti-skid device is operational and the solenoid-operated directional control valve is being switched.

Traditionally, a degree of restriction of the brake fluid by a restirctor is selected so as to obtain a compromise between the above two different requirements. However, these two requirements are inherently incompatible, and difficult to satisfy at the same time. Consequently, one of the requirements is more or less sacrificed for the sake of the other.

SUMMARY OF THE INVENTION

It is therefore an object of the present invention to provide an anti-skid brake system for a vehicle, which is capable of supplying a sufficient flow of brake fluid to the brake cylinders during an initial stage of brake application, and gives a sufficient degree of restriction to the flow of the brake fluid while an anti-skid braking device incorporated in the system has been activated for skid-free brake application to the vehicle wheels.

To achieve the objects and in accordance with the purpose of the invention, as embodied and broadly described herein, the anti-skid brake system of this invention comprises a master cylinder, at least one brake cylinder, a primary fluid passage, a reservoir, a solenoid-operated directional control valve, a control device, a restrictor and a shut-off valve, the directional control valve and the shut-off valve both being operated when the solenoid is energized.

The master cylinder generates a braking hydraulic pressure in response to operation of a brake operating member (such as a brake pedal) of the vehicle. The hydraulic pressure from the master cylinder is supplied to the brake cylinder via the primary fluid passage. The directional control valve is disposed in the primary fluid passage for communication of the brake cylinder selectively with one of the master cylinder and the reservoir for storing a brake fluid. The control device senses a skidding condition of the wheel and controls the directional control valve according to the sensed skidding condition of the wheel. The restrictor and the shut-off valve are disposed in the primary fluid passage. The restrictor is connected in series with the directional control valve, and the shut-off valve in parallel with the restrictor. The shut-off valve is controlled by the control device such that it is normally placed in its open position, and brought into its closed position at the time when the control device has started to activate the directional control valve for preventing the wheel from skidding.

In the anti-skid brake system constructed as described above, a sufficient flow of brake fluid is supplied from the master cylinder to the brake cylinder without passing through the restrictor, via the shut-off valve in the open position before the directional control valve has been activated by the control device to start a skid-free control action. Therefore, there will arise no such problem of delayed braking action of the brake cylinder or local wear of the piston cup of the master cylinder as experienced in the known anti-skid brake system. As soon as the directional control valve has been activated to start a skid-free control operation of regulating the brake fluid, the shut-off valve is brought into its closed position by the control device, whereby the brake fluid is supplied to the brake cylinder via the restrictor, and consequently a sudden or abrupt flow of the fluid into the brake cylinder, which causes an overshoot of the cylinder pressure, is effectively prevented for achieving a smooth control of the braking pressure applied to the brake cylinder.

The restrictor may be disposed between the master cylinder and the directional control valve, or between the brake cylinder and the directional control valve.

The shut-off valve may be connected in parallel with the directional control valve as well as with the restrictor.

According to one embodiment of the invention, the anti-skid brake system comprises a housing in which the directional control valve and the shut-off valve are incorporated, and further comprises a solenoid which is supported by the housing and connected to the control device. This solenoid is used for operating the shut-off valve as well as the directional control valve. According to one form of this embodiment, the restrictor is provided in a by-pass passage formed in the housing so as to communicate with the primary fluid passage and to by-pass the shut-off valve.

In the case where the restrictor is disposed between the master cylinder and the directional control valve, the shut-off valve may comprise a valve seat formed in a portion of the housing which defines a part of the primary fluid passage leading to the master cylinder. That portion of the housing is magnetized by the solenoid upon energization thereof. The shut-off valve further comprises a ball made of a magnetic material which is disposed opposite to and normally spaced from the valve seat. The ball is seated on the valve seat with a magnetic force produced when the solenoid is energized.

According to an advantageous form of the brake system of the invention, the shut-off valve further comprises a cup-shaped member made of a non-magnetic material and having a base wall and a side wall which cooperate to define a recess to accommodate the magnetic ball. The cup-shaped member is fixed to the housing such that the recess is open toward the valve seat.

According to one preferred embodiment of the invention, the directional control valve comprises a cylindrical member axially movably received in a valve chamber formed in a housing of the control valve, and further comprises first and second valving members disposed in the cylindrical member movably in an axial direction of the latter, such that the valving members are movable away from each other within a predetermined range of distance therebetween. The first and second valving members are biased by a first spring in opposite directions away from each other. The housing has a first valve seat in a portion thereof opposite to the first valving member, and a second valve seat in another portion opposite to the second valving member. A first passage in the housing communicating with the master cylinder opens into the first valve seat, and a second passage in the housing communicating with the reservoir opens into the second valve seat. A third passage is formed in the housing to communicate with the brake cylinder, and kept in communication with the valve chamber. The cylindrical member is biased by a second spring toward the second valve seat with a biasing force which is greater than a biasing force of the first spring, in order to normally hold the second valving member seated on the second valve seat, and the first valving member away from the first valve seat. The housing supports a solenoid which is connected to the control device and which cooperates with the housing to generate a first magnetic force which is greater than a difference between the biasing forces of the first and second springs but smaller than a sum of these two biasing forces, and a second magnetic force which is greater than the above sum. The first magnetic force causes the first valving member to be seated on the first valve seat while holding the second valving member seated on the second valve seat, and the second magnetic force causes the second valving member to be separated from the second valve seat while holding the first valving member seated on the first valve seat.

According to a preferred form of the above embodiment, a check valve is provided in a by-pass passage which is formed in the housing so as to communicate with the primary fluid passage and by-pass the shut-off valve. The check valve prevents a flow of the brake fluid in the by-pass passage in a direction from the master cylinder toward the brake cylinder.

In the above preferred form of the brake system, the restrictor may be located in a passage which communicates at one end thereof with the by-pass passage at a point between the check valve and an end of the by-pass passage on the side of the master cylinder, and which communicates at the other end with the first passage at a point between the shut-off valve and the first valve seat.

BRIEF DESCRIPTION OF THE DRAWING

The above and other objects, features and advantages of the present invention will become more apparent from reading the following description of the preferred embodiments taken in connection with the accompanying drawing in which.

DETAILED DESCRIPTION OF THE PREFERRED EMBODIMENTS

Figure 1:
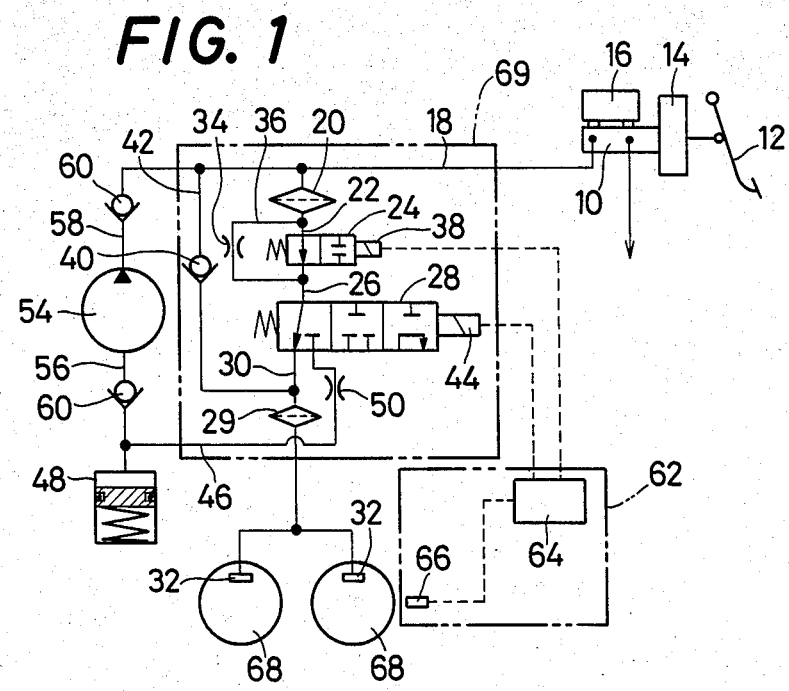
FIG. 1 is a diagrammatic illustration of one embodiment of an anti-skid brake system of constructed in accordance with the present invention.

Referring first to FIG. 1, there is diagrammatically illustrated one preferred arrangement of an anti-skid brake system constructed according to the invention, for use on an automotive vehicle wherein each of the wheels, normally four in number, is provided with a brake which is to be applied to the respective wheel. The brake for each wheel includes a brake cylinder to operate the brake. A hydraulic braking pressure generated by a master cylinder is fed to the four brake cylinders through two mutually independent piping and control systems, one communicating with the brake cylinders for the front wheels, and the other communicating with the brake cylinders for the rear wheels.

In the figure, a master cylinder 10 has two pressure chambers one of which communicates with one of the two independent piping and control system for the front wheels (68, 68 shown in the figure), and the other of which communicates with the other piping system for the rear wheels (not shown). The master cylinder 10 is constructed so that an equal level of hydraulic pressure is generated in the two pressure chambers by movements of a piston (not shown) which is operated with a force applied through a brake pedal 12 (well-known brake operating member) and boosted by a booster 14. Reference numeral 16 designates a brake fluid reservoir communicating with the two pressure chambers of the master cylinder 10. Since the two piping and control systems take substantially the same form of construction, only the piping and control system for the front wheel brake cylinders is illustrated and will be described. It will be apparent that the following description referring to the figures of the accompanying drawing is almost equally applicable to the piping and control system for the rear wheel brake cylinders.

The pressurized fluid delivered to a passage 18 is fed to the front brake cylinders 32, 32 through a filter 20, a passage 22, a solenoid-operated shut-off valve 24, a passage 26, a solenoid-operated directional control valve 28, a filter 29 and a passage 30. The passages 18, 22, 26 and 30 constitute a primary fluid passage connecting one of the pressure chambers of the master cylinder 10 with the pair of front brake cylinders 32. As described, the shut-off valve 24 and the directional control valve 28 are disposed in the primary fluid passage, in series connection with each other.

An auxiliary passage 36 is connected to the primary fluid passage so as to by-pass the shut-off valve 24, and a restrictor 34 is provided in the auxiliary passage 36 such that the restrictor 34 is connected in parallel with the shut-off valve 24, which is normally placed in its open position. The normally-open shut-off valve 24 is brought into its closed position when a solenoid 38 is energized. Normally, that is, while the shut-off valve 24 is open, the pressurized fluid flows through the open shut-off valve 24 which has a fluid passage with a sufficiently large cross sectional area. However, when the shut-off valve 24 is closed, the fluid is forced to by-pass the shut-off valve 24, via the restrictor 34 in the auxiliary passage 36, whereby the flow of the pressurized fluid toward the brake cylinders 32 is restricted by the restrictor 34.

A by-pass passage 42 is connected to the primary fluid passage in parallel with and to by-pass the shut-off valve 24 and the directional control valve 28. In the by-pass passage 42, there is provided a check valve for preventing a flow of the pressurized brake fluid in the by-pass passage 42 in a direction from the master cylinder 10 toward the brake cylinders 32. This arrangement permits a smooth return of the brake fluid from the brake cylinders 32 back to the master cylinder 10 via the by-pass passage 42 which has a sufficiently large cross sectional area.

The solenoid-operated directional control valve 28 is connected through a passage 46 to a reservoir 48 which is provided to store the brake fluid. In the passage 46 is provided another restrictor 50. The directional control valve 28 which is a three-position, three-way valve, is normally placed in its first position of FIG. 1 at which the master cylinder 10 is held in communication with the brake cylinders 32. When a solenoid 44 of the valve 28 is energized, the valve 28 is operated and moves to its second or third position. Stated in more detail, the solenoid 44 is energized in two steps with two different magnitudes of electric current. When a small current is caused to flow through the solenoid 44, the directional control valve 28 is brought to its second position at which all three ports of the valve are closed, whereby the communication between the master cylinder 10 and the brake cylinders 32 is disconnected. When a comparatively large current is supplied to the solenoid 44, the valve 28 is operated to its third position at which the brake cylinders 32 are brought into communication with the reservoir 48, rather than with the master cylinder 10 with which the brake cylinders 32 communicate when the valve 28 is in the first position. With the directional control valve 28 set in the third position, therefore, the brake fluid in the brake cylinders 32 can be returned slowly to the reservoir 48 via the passages 30 and 46, and through the restrictor 50. The brake fluid stored in the reservoir 48 is sucked up through a passage 56 by a pump 54, and the pumped fluid is returned to the primary fluid passage via a passage 58. These passages, 56 and 58 are referred to as a secondary fluid passage, wherein two check valves 60 are provided, one upstream and one downstream of the pump 54.

The soldnoid-operated shut-off and directional control valves 24 and 28 are operated under automatic control of a control device 62 an essential part of which consists of a microcomputer 64 to which a sensor 66 is connected. The sensor 66 senses the rotating speed of the front wheels 68 when the brakes are operated by the brake cylinders 32, as previously indicated. The microcomputer 64 obtains a variation in the rotating speed of the wheels 68 sensed by the sensor 66, i.e., rate of deceleration or acceleration of the wheels 68, and compares the obtained deceleration or acceleration rate with a predetermined value to check whether the wheels 68 are going to enter into a skidding or locked state or recover from the skidding or locked state. In the event the microcomputer 64 has judged that the wheels 68 are in a process of entering into a skidding state, the microcomputer 64 energizes the solenoids 38, 44. On the other hand, if the judgement by the microcomputer 64 reveals that the wheels 68 are going to recover from the skidding state, the microcomputer 64 deenergizes the solenoids 38, 44. Thus, the control device 62 serves to control the shut-off valve 24 and the directional control valve 28, which constitute an essential part of a hydraulic control valve assembly generally indicated at 69. The control device 62 and the valve assembly 69 form an anti-skid device of the anti-skid brake system of the invention.

Figure 2:
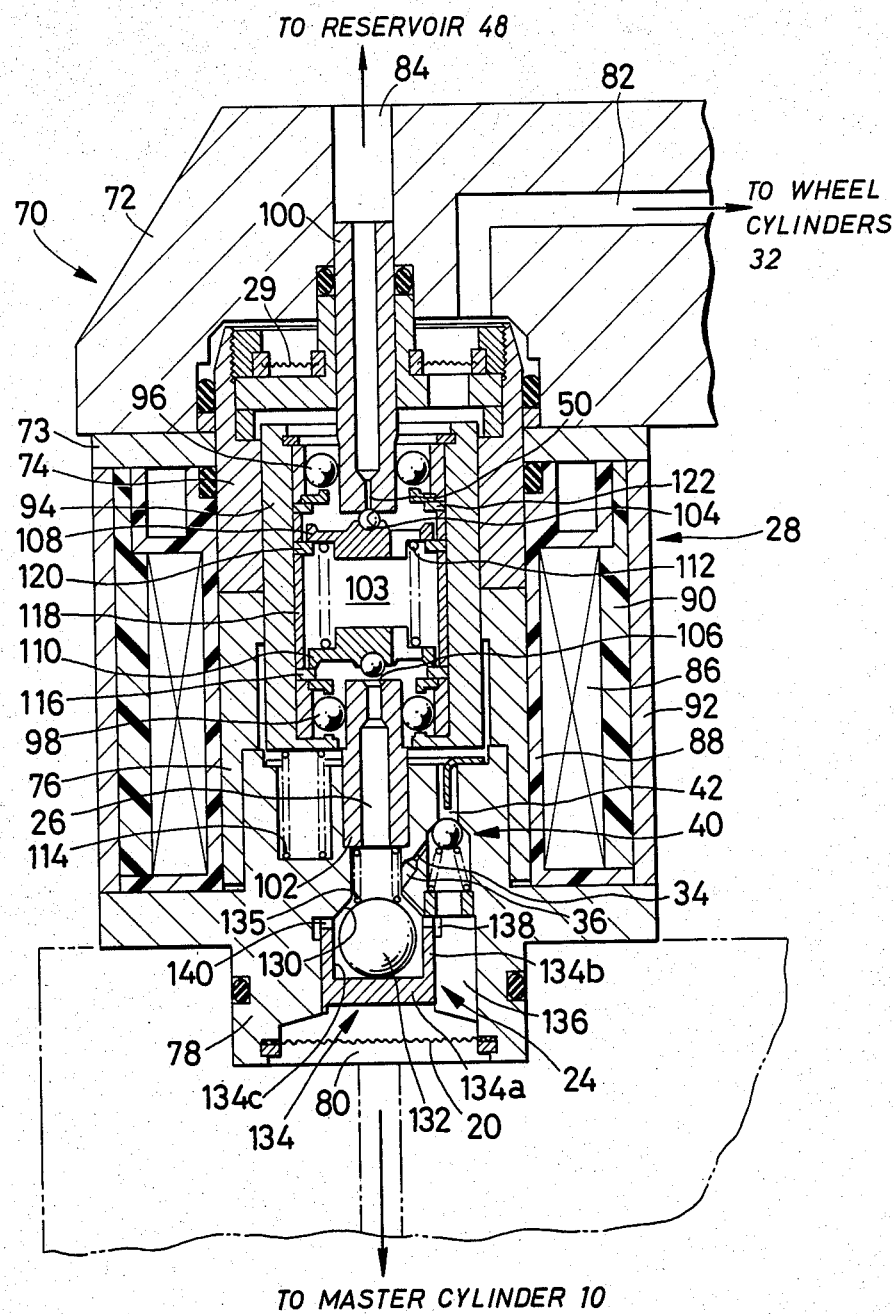
FIG. 2 is an elevational view in cross section of a hydraulic control valve assembly which is an essential part of the anti-skid brake system invention of FIG. 1.

The hydraulic control valve assembly 69 generally indicated in FIG. 1 is shown in detail in FIG. 2, for illustrative purposes only.

In FIG. 2, reference numeral 70 designates a housing 70 of the valve assembly 69. For ease of manufacture, the housing 70 is divided into many housing members including those indicated at 72, 73, 74, 76 and 78. However, these housing members, when assembled, function as a unitary housing. The housing members 73, 74 and 78 are made of suitable magnetic material, and the housing member 76 is made of non-magnetic material. The housing 70 has portions defining a first passage 80, a second passage 84 and a third passage 82 which communicate with the master cylinder 10, the reservoir 48 and the brake cylinders 32, respectively. Outwardly of the housing 70 is supported a solenoid 86 whose coil is wound on a bobbin 88 made of a synthetic resin, and covered with a synthetic resin layer 90. The assembly of the solenoid 86, bobbin 88 and resin layer 92 is fitted in an outer sleeve 90 made of a magnetic material.

The housing 70 has a central opening in which a cylindrical member 94 of a magnetic material is supported via ball bearings 96 and 98 such that the cylindrical member 94 is slidably movable in the central opening in an axial direction along the axis of the cylindrical member 94. Described more specifically, the housing 70 is provided with two concentric sleeve members 100 and 102 which protrude into a valve chamber 103 in their axial direction such that ends of the concentric sleeve members 100, 102 are opposite to each other in the valve chamber 103. These projections, i.e. sleeve members 100 and 102 slidably support the cylindrical member 94 via a bearing device which consists of the bearings 96 and 98. The opposing ends of the sleeve members 102 and 100 are formed with a first and a second valve seat 106, 104, respectively, such that the passage 26 and the second passage 84 are open in the first and second valve seats 106 and 104, respectively. The valve chamber 103 is held in communication with the third passage 82 leading to the brake cylinders 68. In the valve chamber 103, there are disposed a first valving member 110 and a second valving member 108 such that they are located opposite to the first and second valve seats 106 and 104 and movable along the axis of the cylindrical member 94. Each of the valving members 108, 110 consists of a body slidably engaging the inner surface of the cylindrical member 94, and a ball which is fixed to the body and opposite to the open end of the passage 26, 84.

The first and second valving members 110 and 108 are biased by a compression coil spring 112 (first spring) in opposite directions away from each other along the axis of the cylindrical member 94, that is, in the directions that cause the valving members 110 and 108 to be seated on the corresponding first and second valve seats 106 and 104. In the meantime, the cylindrical member 94 is biased by a plurality of compression coil springs 114 (second spring) toward the second valve seat 104. Since a total biasing force of the coil springs 114 is selected to be greater than a biasing force of the spring 112, the cylindrical member 94 is normally located in its original position at which the second valving member 108 is seated on the second valve seat 104. In this position, the cylindrical member 94 is held in indirect abutment on the second valving member 108 via an outer race of the ball bearing 98, and spacers 116, 118 and 120 fitted in the cylindrical member 94, thereby preventing the cylindrical member 94 from moving further toward the second valve seat 104.

The first valving member 110 is seated on the first valve seat 106 when the cylindrical member 94 is moved toward the first valve seat 106 upon energization of the solenoid 86. Upon further energization of the solenoid with a greater electric current, the cylindrical member 94 is moved a further distance toward the first valve seat 106, and the second valving member 108 is moved away from the second valve seat 104 by the cylindrical member 94 via an outer race of the ball bearing 96 and a spacer 122, against the biasing force of the spring 112. Thus, the first and second valving members 110 and 108 are movable away from each other within a predetermined range of distance therebetween.

Further, it is noted that a movement of the cylindrical member 94 toward the first valve seat 106 to seat the valving member 110 on the valve seat 106 will require a force which is greater than a difference of the total biasing force of the springs 114 from the biasing force of the spring 112, while a movement of the cylindrical member 94 to permit the separation of the second valving member 108 away from the second valve seat 104 will require a force which is greater than the sum of the biasing forces of the springs 112 and 114. Accordingly, the solenoid 86 is energized with two different magnitudes of electric current in order to exert on the cylindrical member 94 two different magnetic forces which are determined as described above.

As is apparent from the foregoing description, the three-position directional control valve 28 comprises the housing 70, cylindrical member 94, first and second valving members 110, 108, first and second valve seats 106, 104, springs 112, 114 and solenoid 86. While the solenoid 86 is not energized, the control valve 28 is placed in the first position of FIG. 1 at which the second valving member 108 is seated on the second valve seat 104 while the first valving member 110 is spaced away from the first valve seat 106. When the solenoid 86 is energized with a comparatively small current, the control valve 28 is moved to its second position at which the first valving member 110 is seated on the first valve seat 106 while the second valving member 108 remains seated on the second valve seat 104. With the solenoid 86 energized with a comparatively larger current, the control valve 28 is brought into the third position at which the second valving member 108 is separated from the second valve seat 104 while the first valving member 110 remains seated on the first valve seat 106.

As previously indicated, the passage 26 extending through the sleeve member 102 is open at one end thereof in the first valve seat 106 formed at the end of the member 102. This passage 26 forms a part of the first massage 80 leading to the master cylinder 10. It is understood here that the primary fluid passage previously indicated includes the first passage 80, the valve chamber 103, and the third passage 82 which is connected to the passage 30 of FIG. 1.

The housing member 78 has a portion which defines another valve seat 130 at the other end of the passage 26 opposite to the end at which the first valve seat 106 is formed. Opposite to the valve seat 130, there is disposed a ball 132 made of a magnetic material. The ball 132 is received in a cup-shaped member 134 of a non-magnetic material. The cup-shaped member 134 has a base wall 134a and a side wall 134b which cooperate to define a recess 134c in which the ball 132 is accommodated. The cup-shaped member 134 is fixed to the housing 70 such that the recess is open toward the valve seat 130. The ball 132 is biased by a compression coil spring 135 toward the base wall 134a so that the ball 132 is normally held away from the valve seat 130 by a suitable distance. The first passage 80 further includes an axial groove 136 and an annular groove 138 formed in the housing member 78, and a plurality of cutouts 140 formed through the thickness of an open end of the side wall 134b, so that the annular groove 138 communicates with the recess 134c through the cutouts 140. Thus, the cutouts 140 serve as a communication passage leading to the passage 26. Since the cutouts 140 are formed in the open end of the side wall 134b, the flow of the brake fluid from the master cylinder 10 into the passage 26 through the cutouts 140 will not force the ball 132 against the valve seat 130. This result is obtained provided the cutouts 140 are formed in a portion of the side wall 134b between the open end and an intermediate point at which a gap between the side wall 134b and the spherical surface of the ball 132 is the smallest.

When the solenoid 86 is energized, the ball 132 and the housing member 78 are magnetized and the ball 132 is attracted onto the valve seat 130, whereby the passage 26 (first passage 80) is closed to block the flow of the fluid from the master cylinder 10. As is apparent from the foregoing description, the solenoid 86 functions as the solenoids 38 and 44 shown in FIG. 1, and the solenoid-operated shut-off valve 24 comprises the valve seat 130, ball 132, cup-shaped member 134, spring 135, and solenoid 86.

In the housing member 78, there are further provided the check valve 40, by-pass passage 42, filter 20, restrictor 34, passage 36, etc. shown in FIG. 1. Since their construction is illustrated in FIG. 2 and their functions are evident, no further description will be given.

The operation of the anti-skid brake system illustrated in FIGS. 1 and 2 will be described next.

While the brake pedal 12 is placed in its rest (non-operated or non-depressed) position, the anti-skid brake system of the invention is held in the position shown in FIGS. 1 and 2, at which the master cylinder 10 and the brake cylinders 32 are placed in communication with each other through the primary fluid passage having a sufficient flow area. Upon depression of the brake pedal 12, a pressurized brake fluid is fed from the master cylinder 10 to the brake cylinders 32 without restriction of its flow, and at the same time the normally existing brake clearances of the wheel brakes are eliminated, and the piston cups and other components of the master and brake cylinders 10, 32 are elastically deformed before an effective brake is applied to the wheels 68. In this stage of operation of the brake system, the pressure in the pressure chambers of the master cylinder 10 is not elevated to such an extent as to cause the piston cups of the master cylinder 10 to be locally defaced or worn due to a forced partial engagement of the piston cups with the openings of the compensating ports which communicate with the pressure chambers and the reservoir 16. After the complete elimination of the brake clearances, and the elastic deformation of the piston cups and other components of the brake system, pressures in the brake cylinders 32 are elevated in quick response to an increase in pressure in the master cylinder 10, whereby a brake is applied to each of the wheels 68 without an appreciable delay of actual braking actions of the wheel brakes.

When a normal degree of brake is applied to the wheels 68 in response to normal depression of the brake pedal 12, the wheels 68 do not lock and skid on the road surface, and the anti-skid device (62, 69) of the brake system is not activated. That is, the solenoid-operated shut-off and directional control vavlves 24 and 28 remain in the position of FIGS. 1 and 2. If the brake application is continued in this condition, the vehicle is decelerated to a desired lower speed or brought into a stop. The depression of the brake pedal 12 is then released by the operator, and the pressurized brake fluid in the brake cylinders 32 is smoothly returned to the master cylinder 10 via the by-pass passage 42 equipped with the check valve 40.

In the event of an excessive depression force being exerted on the brake pedal 12, however, the wheels 68 will skid on the road surface, which is detected by the microcomputer 64 based on signals received from the sensor 66 which senses the rotational speeds of the wheels 68. Upon detection of the skidding condition of the wheels 68, the microcomputer 64 supplies a small electric current to the solenoids 38, 44 of the shut-off and directional control valves 24, 28, i.e., to the solenoid 86 of FIG. 2. As a result, the shut-off valve 24 is closed, and the directional control valve 28 is brought into its second position whereby not only the primary fluid passage but also the secondary fluid passage (equipped with the recirculation pump 54) are disconnected from the wheel cylinders 32 by the directional control valve 28. In other words, the brake cylinders 32 are completely disconnected from the master cylinder 10, i.e., flow of the fluid to and from the brake cylinders 32 is blocked by the directional control valve 28.

If the above indicated control of the brake fluid, with the valve 28 held in the second position, is found effective for permitting the wheels 68 to recover from their skidding condition, the microcomputer 64 maintains the valve 28 in the second position. However, if the disconnection of the primary and secondary fluid passages so as to maintain the pressures in the brake cylinders 32 is found ineffective for clearing the skidding condition of the wheels 68, the control device 62 supplies a comparatively large current to the solenoid 86 to place the directional control valve 28 into its third position at which the brake cylinders 32 remain disconnected from the master cylinder 10, but are placed in communication with the reservoir 48. Consequently, the pressurized fluid in the brake cylinders 32 is allowed to flow toward the reservoir 48 through the directional control valve 28 and the passage 46, whereby the pressures in the brake cylinders 32 are lowered and the skidding conditions of the wheels 68 are removed.

The complete recovery of the wheels 68 from the skidding condition is detected by the microcomputer 64, and the electric supply to the solenoid 86 is cut off. As a result, the solenoid 86 is deenergized and the directional control valve 28 is restored to its original first position of FIG. 1. However, the ball 132 (FIG. 2) of the shut-off valve 24 is held seated on the valve seat 130 due to a pressure difference between the passage 26 and the recess 134c. In this condition, the brake fluid from the master cylinder 10 is supplied to the brake cylinders 32 through the auxiliary passage 36 having the restrictor 34, and through the directional control valve 28.

As is apparent from the foregoing description, once the control device 62 has started its control to activate the directional control valve 28 to prevent or stop the skidding of the wheels 68, the supply of the brake fluid from the master cylinder 10 to the brake cylinders 32 is accomplished through the restrictor 34 provided in the auxiliary passage 36, and the return of the brake fluid from the brake cylinders 32 to the reservoir 48 is effected through the restrictor 50 in the passage 46. Stated differently, after the control device 62 has found the wheels 68 to be about to skid or in the process of skidding, the variation in the pressures in the brake cylinders 32 is controlled to take place at a low rate. Thus, the anti-skidding control of the fluid pressure in the brake cylinders 32 by the anti-skid device (62, 69) of the system is achieved with a high operational stability.

When the brake fluid is supplied from the master cylinder 10 to the brake cylinders 32 after the brake fluid in the cylinders 32 has been discharged and after the directional control valve 28 has been returned to the first position, the amount of depression of the brake pedal 12 increases to an extent corresponding to the amount of the fluid supplied to the brake cylinders 32. However, the fluid stored in the reservoir 48 is subsequently pumped back to the master cylinder 10 at a relatively low rate by the recirculation pump 54 with a small delivery capacity. With this recirculation of the brake fluid, the brake pedal 12 is restored to the original position, whereby the normal braking operation can be performed with the predetermined normal amount of depression of the brake pedal 12.

Each time the directional control valve 28 is activated by the control device 62, the above described operation of the brake system is performed in order to achieve an efficient braking operation without skidding of the wheels 68. Since the required amount of depression of the brake pedal 12 to apply a brake is changed when the anti-skid device (62, 69) is activated, the operator of the vehicle can feel the activation of the anti-skid device of the brake system.

While the hydraulic control assembly 69 indicated in FIG. 1 has been described with a greater particularity referring to FIG. 2, it is to be understood that a shut-off valve and a directional control valve used in the anti-skid device (62, 69) of the brake system of the invention are not limited to the valves 24, 28 illustrated in FIG. 2. Further, the solenoids 28 and 44 shown in FIG. 1 need not be provided in the form of the common solenoid 86. It is appreciated that the solenoid 38 of the shut-off valve 24 can be held energized while the directional control valve 28 is activated under control of the control device 62.

Figure 3:
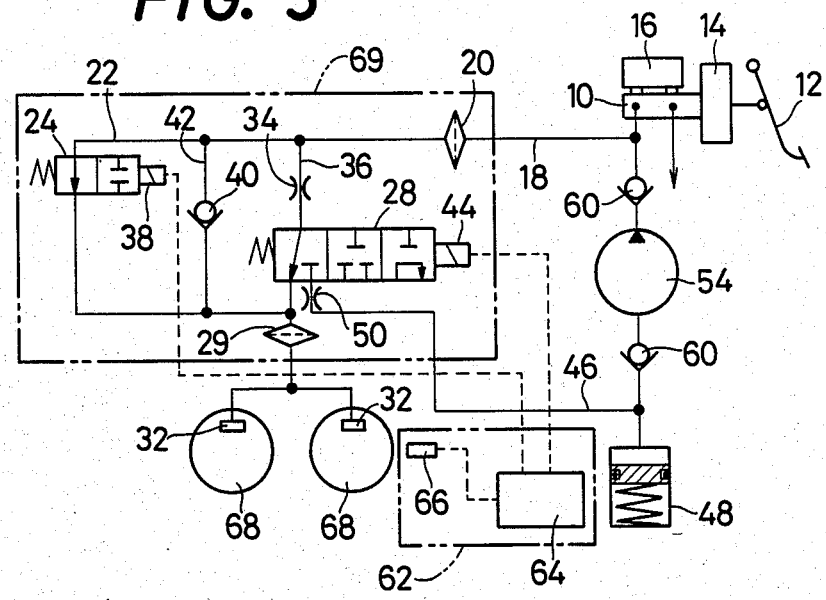
FIGS. 3 and 4 are views of the construction of another embodiment of the present invention, corresponding to FIGS. 1 and 2.
Figure 4:
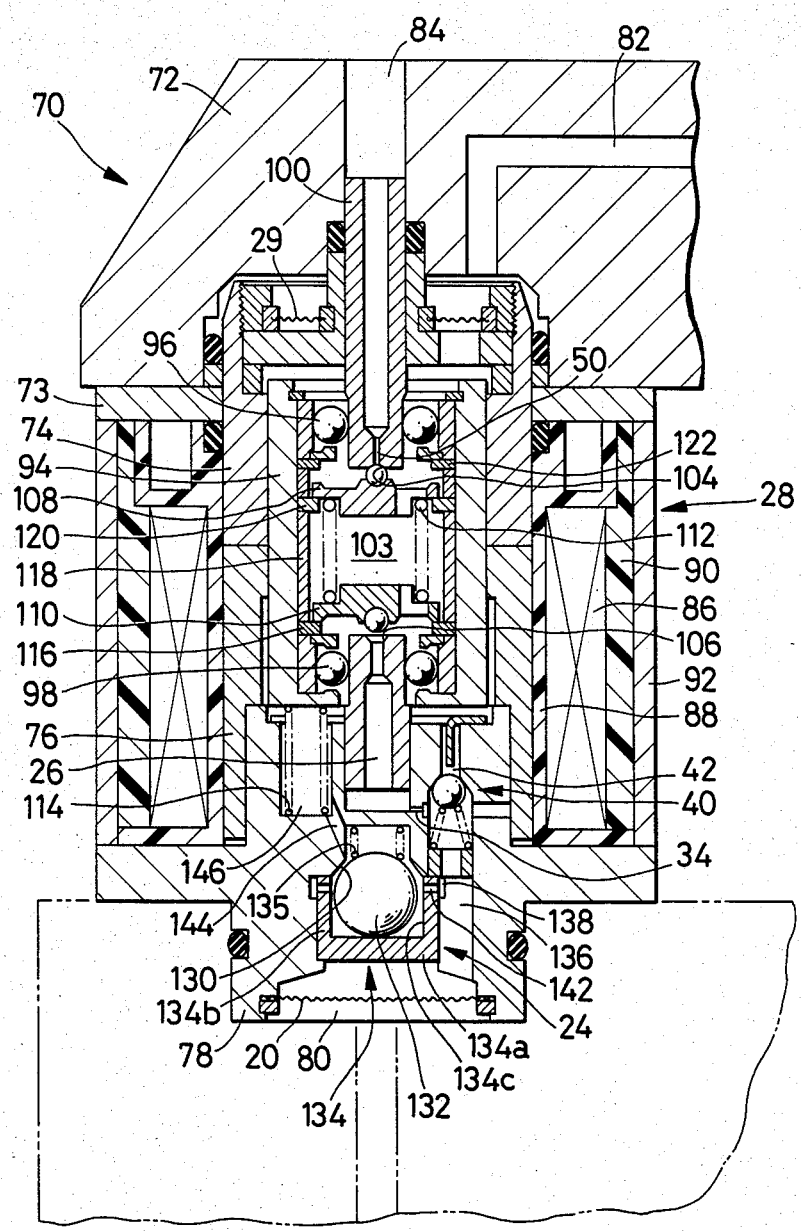

Another preferred embodiment of the anti-skid brake system of the invention is diagrammatically shown in FIG. 3, and its hydraulic control assembly 69 is illustrated in FIG. 4 with a greater particularity. The same reference numerals as used in FIGS. 1 and 2 are used in FIGS. 3 and 4 to identify the corresponding elements. The following description refers only to those parts of this alternative embodiment which are different from the corresponding elements of the preceding embodiment.

A major difference of the second embodiment from the first embodiment resides in that the shut-off valve 24 is connected in parallel with the directional control valve 28 as well as with the restrictor 34. As shown in FIG. 4, the first passage 80 leading to the master cylinder 10 communicates with the valve chamber 103 (in the cylindrical member 94) through: the axial and annular grooves 136 and 138; plural through-holes 142 formed through the side wall 134b of the cup-shaped member 134; a passage 144; and a chamber 146 accommodating the springs 114. Thus, these passages 136, 138, 142, 144 and 146 form a by-pass passage which by-passes the directional control valve 28, and through this by-pass passage the brake fluid from the first passage 80 flows into the third passage 82, substantially by-passing the directional control valve 28.

Since the second embodiment is operated in substantially the same manner as the first embodiment, the operational description is omitted.

Figure 5:
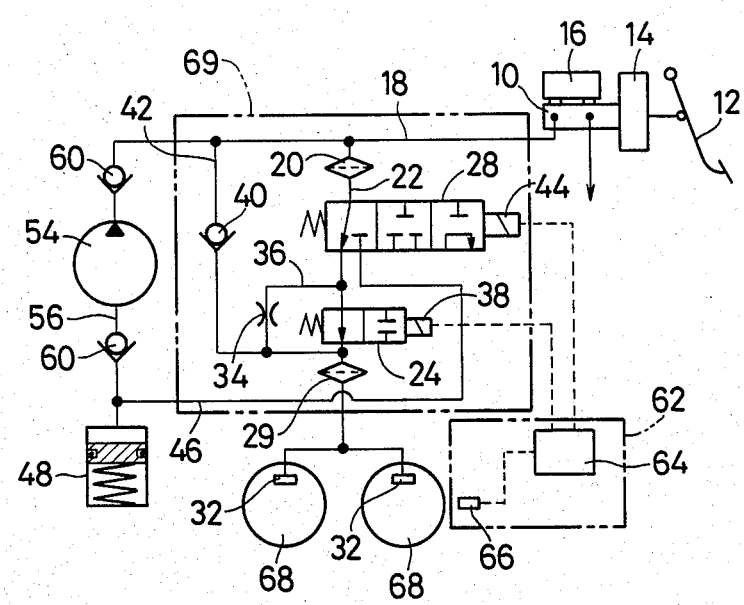
FIG. 5 is a diagrammatic illustration, corresponding to FIGS. 1 and 3, of the construction of a further embodiment of the present invention.

A further alternative embodiment of the invention is illustrated in FIG. 5 wherein, contrary to the arrangement of the preceding embodiments, the shut-off valve 24 and the auxiliary passage 36 with the restrictor 34 are provided downstream of the directional control valve 28, i.e., on the side nearer to the brake cylinders 32. In the other aspects, this second alternative embodiment is almost identical to the previous embodiments. Using the same reference numerals to identify the corresponding elements, no further description of the embodiment of FIG. 5 is provided, except that the restrictor 34 in this embodiment serves to restrict not only the flow of the fluid into the brake cylinders 32, but also the flow of the fluid from the brake cylinders 32 toward the reservoir 48 via the directional control valve 28.

While the anti-skid brake system of the present invention has been described in its preferred embodiments wherein the brake fluid is supplied to the front and rear pairs of wheels via the respective two mutually independent piping and control systems, it will be obvious that the invention may be otherwise embodied. For example, the anti-skid device may be used for each of the right and left front wheel brake cylinders which are independent of each other, and even for each of the brake cylinders of both front and rear wheels which are independent of each other. Further, it is possible that the location and construction of the shut-off and directional control valves 24, 28 and other components be changed as desired. The anti-skid brake system may serve without the pump 54. It is understood that the anti-skid brake system of the invention may be used to apply a brake to a propeller shaft or other elements of a vehicle for restraining the rotation of the wheels, rather than to directly act on the wheels for braking the vehicle.

Obviously, other changes and modifications of the present invention are possible to those skilled in the art in the light of the above teachings, within the scope of the invention defined by the appended claims.

What is claimed is:

1. An anti-skid brake system for a vehicle, comprising:
    a master cylinder generating a hydraulic braking pressure in response to operation of a brake operating member of the vehicle;
    at least one brake cylinder for applying a brake to a wheel of the vehicle;
    a primary fluid passage for connecting said at least one brake cylinder and said master cylinder;
    a reservoir for storing a brake fluid;
    a solenoid-operated directional control valve disposed in said primary fluid passage and operable selectively in a first position for providing communication of said at least one brake cylinder with said master cylinder, a second position for providing communication of said at least one brake cylinder with said reservoir, and a third position for inhibiting communication of said at least one brake cylinder with said master cylinder and said reservoir;
    a control device sensing a skidding condition of said wheel and controlling said directional control valve according to the sensed skidding condition of the wheel;
    a restrictor disposed in said primary fluid passage in series connection with said directional control valve; and
    a solenoid-operated shut-off valve disposed in said primary fluid passage in parallel connection with said restrictor and controlled by said control device, said shut-off valve being normally placed in an open position thereof, and brought into a closed position thereof at the time when said control device has started to activate said directional control valve for preventing said wheel from skidding.

2. An anti-skid brake system as set forth in claim 1, wherein said restrictor is disposed between said master cylinder and said directional control valve.

3. An anti-skid brake system as set forth in claim 2, further comprising a housing in which said directional control valve and said shut-off valve are incorporated, and said solenoid being supported by said housing and wherein said shut-off valve comprises a valve seat formed in a portion of said housing which defines a part of said primary fluid passage leading to said master cylinder, which portion is magnetized by said solenoid upon energization thereof, said shut-off valve further comprising a ball made of a magnetic material which is disposed opposite to and normally spaced from said valve seat, said ball being seated on said valve seat with a magnetic force upon energization of said solenoid.

4. An anti-skid brake system as set forth in claim 1, wherein said restrictor is disposed between said at least one brake cylinder and said directional control valve.

5. An anti-skid brake system as set forth in claim 1, further comprising a housing incorporating said directional control valve and said shut-off valve, said housing having a portion which serves as a valve seat of said shut-off valve, said primary fluid passage passing through said valve seat.

6. An anti-skid brake system as set forth in claim 5, wherein said shut-off valve comprises a ball made of a magnetic material, and a cup-shaped member made of a non-magnetic material and having a base wall and a side wall which cooperate to define a recess, said cup-shaped member being fixed to said housing such that said recess is open toward said valve seat, said ball being received in said recess.

7. An anti-skid brake system as set forth in claim 6, wherein said side wall has at least one communication passage forming a part of said primary fluid passage, said at least one communication passage being formed in a portion of said side wall between an open end thereof and an intermediate point thereof at which a gap between said side wall and said ball is the smallest.

8. An anti-skid brake system as set forth in claim 5, wherein said restrictor is provided in an auxiliary passage which is formed in said housing, said auxiliary passage forming a part of said primary fluid passage and by-passing said shut-off valve.

9. An anti-skid brake system for a vehicle, comprising:
a master cylinder generating a hydraulic braking pressure in response to operation of a brake operating member of the vehicle;
at least one brake cylinder for applying a brake to a wheel of the vehicle;
a primary fluid passage for connecting said at least one brake cylinder and said master cylinder;
a reservoir for storing a brake fluid;
a solenoid-operated directional control valve disposed in said primary fluid passage for providing communication of said at least one brake cylinder selectively with either said master cylinder or said reservoir;
a control device sensing a skidding condition of said wheel and controlling said directional control valve according to the sensed skidding condition of the wheel;
a restrictor disposed in said primary fluid passage in series connection with said directional control valve;
a shut-off valve disposed in said primary fluid passage in parallel connection with said restrictor and controlled by said control device, said shut-off valve being normally in an open position thereof, and brought into a closed position thereof at the time when said control device has started to activate said directional control valve for preventing said wheel from skidding; and
a single solenoid connected to said control device, said directional control valve and said shut-off valve both being operated when said solenoid is energized;
and wherein said directional control valve comprises:
a housing having a valve chamber, and a first passage, a second passage and a third passage communicating with said master cylinder, said reservoir and said at least one brake cylinder, respectively, said third passage being kept in communication with said valve chamber, said primary fluid passage comprising said valve chamber, and said first and third passages;
a cylindrical member axially movably received in said valve chamber;
first and second valving members disposed in said cylindrical member movably in an axial direction of the cylindrical member, said first and second valving members being movable away from each other within a predetermined range of distance therebetween;
a first spring biasing said first and second valving members in opposite directions away from each other in said axial direction;
a first valve seat formed in a portion of said housing opposite to said first valving member, said first passage being open in said first valve seat;
a second valve seat formed in another portion of said housing opposite to said second valving member, said second passage being open in said second valve seat; and
a second spring biasing said cylindrical member toward said second valve seat with a biasing force greater than a biasing force of said first spring, to normally hold said second valving member seated on said second valve seat, and said first valving member away from said first valve seat;
said solenoid being supported by said housing and connected to said control device, said solenoid cooperating with said housing to generate a first magnetic force which is greater than a difference between the biasing forces of said first and second springs but smaller than a sum of said biasing forces, and a second magnetic force which is greater than said sum, said first magnetic force causing said first valving member to be seated on said first valve seat while holding said second valving member seated on said second valve seat, and said second magnetic force causing said second valving member to be separated from said second valve seat while holding said first valving member seated on said first valve seat.

10. An anti-skid brake system as set forth in claim 9, wherein said housing includes two concentric projections which protrude into said valve chamber in said axial direction such that ends of said concentric projections in said valve chamber are opposite to each other, said concentric projections supporting said cylindrical member via ball bearing device disposed between saidd projections and said cylindrical member, said first and second valve seats being formed on said ends of the projections opposite to each other.

11. An anti-skid brake system as set forth in claim 9, wherein a check valve is provided in a by-pass passage which is formed in said housing, said by-pass passage communicating with said primary fluid passage and by-passing said shut-off valve, said check valve preventing a flow of a brake fluid in said by-pass passage in a direction from said master cylinder toward said at least one brake cylinder.

12. An anti-skid brake system as set forth in claim 11, wherein said restrictor is provided in a passage which communicates at one end thereof with said by-pass passage at a point thereof between said check valve and an end of said by-pass passage on the side of said master cylinder, and which communicates at the other end with said first passage at a point between said shut-off valve and said first valve seat.

13. A fluid control device including a solenoid-operated directional control valve; a solenoid-operated shut-off valve; and a restrictor disposed in parallel connection with said shut-off valve; and wherein said directional control valve comprises:
   a housing having a valve chamber, and a first passage, a second passage and a third passage communicating with respective elements in a pressure-operated system;
   a cylindrical member axially movably received in said valve chamber;
   first and second valving members disposed in said cylindrical member movably in an axial direction of the cylindrical member, said first and second valving members being movable away from each other within a predetermined range of distance therebetween;
   a first spring biasing said first and second valving members in opposite directions away from each other in said axial direction;
   a first valve seat formed in a portion of said housing opposite to said first valving member, said first passage being open in said first valve seat;
   a second valve seat formed in another portion of said housing opposite to said second valving member, said second passage being open in said second valve seat;
   a second spring biasing said cylindrical member toward said second valve seat with a biasing force greater than a biasing force of said first spring, to normally hold said second valving member seated on said second valve seat, and said first valving member away from said first valve seat;
   a solenoid supported by said housing and connected to said control device, said solenoid cooperating with said housing to generate a first magnetic force which is greater than a difference between the biasing forces of said first and second springs but smaller than a sum of said biasing forces, and a second magnetic force which is greater than said sum, said first magnetic force causing said first valving member to be seated on said first valve seat while holding said second valving member seated on said second valve seat, and said second magnetic force causing said second valving member to be separated from said second valve seat while holding said first valving member seated on said first valve seat; and
   said shut-off valve being connected with said directional control valve through one of said first and second passages, and comprising a valve seat formed in a portion of said housing which defines a part of said one of the first and second passages, said portion of the housing being magnetized by said solenoid upon energization thereof, said shut-off valve further comprising a ball made of a magnetic material which is disposed opposite to and normally spaced from said valve seat, said ball being seated on said valve seat with a magnetic force upon energization of said solenoid.

14. An anti-skid brake system for a vehicle, comprising:
   a master cylinder generating a hydraulic braking pressure in response to operation of a brake operating member of the vehicle;
   at least one brake cylinder for applying a brake to a wheel of the vehicle;
   a primary fluid passage for connecting said at least one brake cylinder and said master cylinder;
   a reservoir for storing a brake fluid;
   a solenoid-operated directional control valve disposed in said primary fluid passage for providing communication of said at least one brake cylinder selectively with either said master cylinder or said reservoir;
   a control device sensing a skidding condition of said wheel and controlling said directional control valve according to the sensed skidding condition of the wheel;
   a restrictor disposed in said primary fluid passage between and in series connection with said master cylinder and said directional control valve;
   a shut-off valve disposed in said primary fluid passage in parallel connection with said directional control valve and said restrictor and controlled by said control device, said shut-off valve being normally in an open position thereof, and brought into a closed position thereof at the time when said control device has started to activate said directional control valve for preventing said wheel from skidding; and
   a single solenoid connected to said control device, said directional control valve and said shut-off valve both being operated when said solenoid is energized.

* * * * *